(12) United States Patent
Ding et al.

(10) Patent No.: US 11,495,126 B2
(45) Date of Patent: Nov. 8, 2022

(54) SYSTEMS AND METHODS FOR DRIVING INTELLIGENCE ALLOCATION BETWEEN VEHICLES AND HIGHWAYS

(71) Applicant: CAVH LLC, Fitchburg, WI (US)

(72) Inventors: Fan Ding, Madison, WI (US); Bin Ran, Fitchburg, WI (US); Yang Cheng, Middleton, WI (US); Shen Li, Madison, WI (US); Zhen Zhang, Madison, WI (US); Yang Zhou, Madison, WI (US); Huachun Tan, Madison, WI (US); Shuoxuan Dong, Madison, WI (US); Tianyi Chen, Madison, WI (US); Xiaotian Li, Madison, WI (US); Kunsong Shi, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 218 days.

(21) Appl. No.: 16/406,621

(22) Filed: May 8, 2019

(65) Prior Publication Data
US 2019/0347931 A1 Nov. 14, 2019

Related U.S. Application Data

(60) Provisional application No. 62/669,215, filed on May 9, 2018.

(51) Int. Cl.
*G08G 1/01* (2006.01)
*G05B 13/02* (2006.01)
(Continued)

(52) U.S. Cl.
CPC ....... *G08G 1/0145* (2013.01); *G05B 13/0265* (2013.01); *G05D 1/0285* (2013.01);
(Continued)

(58) Field of Classification Search
CPC .. G08G 1/0116; G08G 1/0141; G08G 1/0145; G08G 1/096725; G08G 1/096775;
(Continued)

(56) References Cited

U.S. PATENT DOCUMENTS 3,824,469 A 7/1974 Ristenbatt
4,023,017 A 5/1977 Ceseri
(Continued)

FOREIGN PATENT DOCUMENTS

CN 102768768 B 11/2012
CN 103854473 A 6/2014
(Continued)

OTHER PUBLICATIONS

Translation of Ran is attached (Year: 2017).*
(Continued)

*Primary Examiner* — Kenneth J Malkowski
(74) *Attorney, Agent, or Firm* — Casimir Jones S.C.; Thomas A. Isenbarger

(57) ABSTRACT

The present invention relates to systems and methods that allocate, arrange, and distribute certain types of functions and intelligence, for connected automated vehicle highway (CAVH) systems, to facilitate vehicle operations and controls, to improve the general safety of the whole transportation system, and to ensure the efficiency, intelligence, reliability, and resilience of CAVH systems. The present invention also provides methods to define CAVH system intelligence and its levels, which are based on two dimensions: the vehicle intelligence and infrastructure intelligence.

19 Claims, 9 Drawing Sheets

(51) Int. Cl.
  *G05D 1/02* (2020.01)
  *G08G 1/0967* (2006.01)
(52) U.S. Cl.
  CPC ......... *G08G 1/0112* (2013.01); *G08G 1/0116* (2013.01); *G08G 1/0125* (2013.01); *G08G 1/096708* (2013.01); *G08G 1/096775* (2013.01); *G05D 2201/0213* (2013.01)
(58) Field of Classification Search
  CPC ....... G08G 1/096716; G08G 1/096741; G08G 1/164; G01S 2013/9316; B60W 2556/50; H04L 67/12; H04L 67/125
  See application file for complete search history.

(56) References Cited

U.S. PATENT DOCUMENTS

| | | |
|---|---|---|
| 4,704,610 A | 11/1987 | Smith et al. |
| 4,962,457 A | 10/1990 | Chen et al. |
| 5,420,794 A | 5/1995 | James |
| 5,504,683 A | 4/1996 | Gurmu |
| 5,625,559 A | 4/1997 | Egawa |
| 5,732,785 A | 3/1998 | Ran et al. |
| 6,028,537 A | 2/2000 | Suman et al. |
| 6,064,318 A | 5/2000 | Kirchner, III et al. |
| 6,317,682 B1 | 11/2001 | Ogura et al. |
| 6,829,531 B2 | 12/2004 | Lee |
| 6,900,740 B2 | 5/2005 | Bloomquist et al. |
| 7,295,904 B2 | 11/2007 | Kanevsky et al. |
| 7,324,893 B2 | 1/2008 | Yamashita et al. |
| 7,343,243 B2 | 3/2008 | Smith |
| 7,382,274 B1 | 6/2008 | Kermani et al. |
| 7,418,346 B2 | 6/2008 | Breed et al. |
| 7,421,334 B2 | 9/2008 | Dahlgren et al. |
| 7,425,903 B2 | 9/2008 | Boss et al. |
| 7,554,435 B2 | 6/2009 | Tengler et al. |
| 7,725,249 B2 | 5/2010 | Kickbusch |
| 7,860,639 B2 | 12/2010 | Yang |
| 7,894,951 B2 | 2/2011 | Norris et al. |
| 7,979,172 B2 | 7/2011 | Breed |
| 8,352,112 B2 | 1/2013 | Mudalige |
| 8,527,139 B1 | 9/2013 | Yousuf |
| 8,589,070 B2 | 11/2013 | Ban |
| 8,630,795 B2 | 1/2014 | Breed et al. |
| 8,682,511 B2 | 3/2014 | Andreasson |
| 8,972,080 B2 | 3/2015 | Shida et al. |
| 9,053,636 B2 | 6/2015 | Gordon |
| 9,076,332 B2 | 7/2015 | Myr |
| 9,120,485 B1 | 9/2015 | Dolgov |
| 9,182,951 B1 | 11/2015 | Ormerod et al. |
| 9,349,055 B1 | 5/2016 | Ogale |
| 9,494,935 B2 | 11/2016 | Okumura et al. |
| 9,495,874 B1 | 11/2016 | Zhu et al. |
| 9,595,190 B2 | 3/2017 | Mccrary |
| 9,646,496 B1 | 5/2017 | Miller et al. |
| 9,654,511 B1 | 5/2017 | Brocco et al. |
| 9,665,101 B1 | 5/2017 | Templeton |
| 9,731,713 B2 | 8/2017 | Horii |
| 9,799,224 B2 | 10/2017 | Okamoto |
| 9,845,096 B2 | 12/2017 | Urano et al. |
| 9,940,840 B1 | 4/2018 | Schubert et al. |
| 9,964,948 B2 | 5/2018 | Ullrich et al. |
| 10,074,223 B2 | 9/2018 | Newman |
| 10,074,273 B2 | 9/2018 | Yokoyama et al. |
| 10,380,886 B2 | 8/2019 | Ran et al. |
| 2002/0008637 A1 | 1/2002 | Lemelson et al. |
| 2003/0045995 A1 | 3/2003 | Lee |
| 2004/0145496 A1 | 7/2004 | Ellis |
| 2004/0230393 A1 | 11/2004 | Tzamaloukas |
| 2005/0060069 A1 | 3/2005 | Breed et al. |
| 2005/0102098 A1 | 5/2005 | Montealegre et al. |
| 2005/0209769 A1 | 9/2005 | Yamashita et al. |
| 2005/0222760 A1 | 10/2005 | Cabral et al. |
| 2006/0142933 A1 | 6/2006 | Feng |
| 2006/0226968 A1 | 10/2006 | Tengler et al. |
| 2006/0251498 A1 | 11/2006 | Buzzoni et al. |
| 2007/0093997 A1 | 4/2007 | Yang et al. |
| 2007/0146162 A1 | 6/2007 | Tengler et al. |
| 2008/0042815 A1 | 2/2008 | Breed et al. |
| 2008/0095163 A1 | 4/2008 | Chen et al. |
| 2008/0150786 A1 | 6/2008 | Breed |
| 2008/0161986 A1 | 7/2008 | Breed et al. |
| 2008/0161987 A1 | 7/2008 | Breed |
| 2008/0275646 A1 | 11/2008 | Perng et al. |
| 2010/0013629 A1 | 1/2010 | Sznaider et al. |
| 2010/0256836 A1 | 10/2010 | Mudalige et al. |
| 2011/0224892 A1 | 9/2011 | Speiser |
| 2011/0227757 A1 | 9/2011 | Chen et al. |
| 2012/0017262 A1 | 1/2012 | Kapoor et al. |
| 2012/0022776 A1 | 1/2012 | Razavilar et al. |
| 2012/0059574 A1 | 3/2012 | Hada |
| 2012/0105639 A1 | 5/2012 | Stein et al. |
| 2012/0142786 A1 | 6/2012 | Goralczyk et al. |
| 2012/0283910 A1 | 11/2012 | Lee et al. |
| 2012/0303807 A1 | 11/2012 | Akelbein et al. |
| 2013/0116915 A1 | 5/2013 | Ferreira et al. |
| 2013/0137457 A1 | 5/2013 | Potkonjak |
| 2013/0138714 A1 | 5/2013 | Ricci |
| 2013/0141580 A1 | 6/2013 | Stein et al. |
| 2013/0204484 A1 | 8/2013 | Ricci |
| 2013/0218412 A1 | 8/2013 | Ricci |
| 2013/0297140 A1 | 11/2013 | Montemerlo et al. |
| 2013/0297196 A1 | 11/2013 | Shida |
| 2014/0112410 A1 | 4/2014 | Yokoyama |
| 2014/0219505 A1 | 8/2014 | Kindo et al. |
| 2014/0222322 A1 | 8/2014 | Durekovic |
| 2014/0278026 A1 | 9/2014 | Taylor |
| 2014/0278052 A1 | 9/2014 | Slavin et al. |
| 2014/0354451 A1 | 12/2014 | Tonguz et al. |
| 2015/0153013 A1 | 6/2015 | Zhao et al. |
| 2015/0169018 A1 | 6/2015 | Rogo et al. |
| 2015/0197247 A1 | 7/2015 | Ichinowaka |
| 2015/0199685 A1 | 7/2015 | Betancourt et al. |
| 2015/0211868 A1 | 7/2015 | Matsushita et al. |
| 2015/0310742 A1 | 10/2015 | Albornoz |
| 2016/0042303 A1 | 2/2016 | Medina et al. |
| 2016/0086391 A1 | 3/2016 | Ricci |
| 2016/0110820 A1 | 4/2016 | Fleck et al. |
| 2016/0132705 A1 | 5/2016 | Kovarik et al. |
| 2016/0142492 A1 | 5/2016 | Fang et al. |
| 2016/0148440 A1 | 5/2016 | Kwak |
| 2016/0216130 A1 | 7/2016 | Abramson et al. |
| 2016/0221186 A1 | 8/2016 | Perrone |
| 2016/0231746 A1 | 8/2016 | Hazelton et al. |
| 2016/0238703 A1 | 8/2016 | Liu et al. |
| 2016/0325753 A1 | 11/2016 | Stein et al. |
| 2016/0328272 A1 | 11/2016 | Ahmed et al. |
| 2016/0330036 A1 | 11/2016 | Zhou et al. |
| 2016/0370194 A1 | 12/2016 | Colijn et al. |
| 2017/0026893 A1 | 1/2017 | Lagassey |
| 2017/0039435 A1 | 2/2017 | Ogale et al. |
| 2017/0046883 A1 | 2/2017 | Gordon et al. |
| 2017/0053529 A1 | 2/2017 | Yokoyama et al. |
| 2017/0075195 A1 | 3/2017 | Stein et al. |
| 2017/0085632 A1 | 3/2017 | Cardote |
| 2017/0090994 A1 | 3/2017 | Jubinski et al. |
| 2017/0109644 A1 | 4/2017 | Nariyambut Murali et al. |
| 2017/0131435 A1 | 5/2017 | Peacock et al. |
| 2017/0206783 A1 | 7/2017 | Miller |
| 2017/0262790 A1 | 9/2017 | Khasis |
| 2017/0276492 A1 | 9/2017 | Ramasamy |
| 2017/0324817 A1 | 11/2017 | Oliveira et al. |
| 2017/0337571 A1 | 11/2017 | Bansal et al. |
| 2017/0339224 A1 | 11/2017 | Condeixa et al. |
| 2017/0357980 A1 | 12/2017 | Bakun et al. |
| 2018/0018216 A1 | 1/2018 | Halford et al. |
| 2018/0053413 A1 | 2/2018 | Patil et al. |
| 2018/0065637 A1 | 3/2018 | Bassindale |
| 2018/0114079 A1 | 4/2018 | Myers et al. |
| 2018/0151064 A1 | 5/2018 | Xu et al. |
| 2018/0158327 A1 | 6/2018 | Gärtner |
| 2018/0190116 A1 | 7/2018 | Bauer et al. |
| 2018/0262887 A1 | 9/2018 | Futaki |
| 2018/0299274 A1 | 10/2018 | Moghe et al. |

(56) References Cited

U.S. PATENT DOCUMENTS

| | | | |
|---|---|---|---|
| 2018/0308344 | A1 | 10/2018 | Ravindranath et al. |
| 2018/0336780 | A1 | 11/2018 | Ran et al. |
| 2019/0096238 | A1 | 3/2019 | Ran et al. |
| 2019/0206255 | A1* | 7/2019 | Tao .................. H04W 4/40 |
| 2019/0244518 | A1 | 8/2019 | Yang et al. |
| 2019/0244521 | A1 | 8/2019 | Ran et al. |
| 2019/0258251 | A1* | 8/2019 | Ditty .................. G05D 1/0274 |
| 2020/0005644 | A1* | 1/2020 | Ichimaru .................. B60R 21/00 |
| 2020/0064140 | A1* | 2/2020 | Tarkiainen .................. G08G 1/22 |

FOREIGN PATENT DOCUMENTS

| | | | | |
|---|---|---|---|---|
| CN | 104485003 | B | | 4/2015 |
| CN | 106710203 | A | * | 5/2017 |
| CN | 106710203 | A | | 5/2017 |
| CN | 107665578 | A | | 2/2018 |
| CN | 107807633 | A | | 3/2018 |
| CN | 108039053 | A | | 5/2018 |
| CN | 108447291 | A | | 8/2018 |
| EP | 2395472 | A1 | | 12/2011 |
| KR | 20170008703 | A | | 1/2017 |
| WO | WO 2015/114592 | A1 | | 8/2015 |
| WO | WO 2016/077027 | A1 | | 5/2016 |
| WO | WO 2016/135561 | A1 | | 9/2016 |
| WO | WO 2017/049978 | A1 | | 3/2017 |
| WO | WO 2017/079474 | A2 | | 5/2017 |
| WO | WO 2017/115342 | A1 | | 7/2017 |
| WO | WO 2017/160276 | A1 | | 9/2017 |
| WO | WO 2018/039134 | A1 | | 3/2018 |
| WO | WO 2018/132378 | | | 7/2018 |
| WO | WO 2019/156955 | A1 | | 8/2019 |
| WO | WO 2019/156956 | A1 | | 8/2019 |
| WO | WO-2020205597 | A1 | * | 10/2020 ............ B60W 60/00 |

OTHER PUBLICATIONS

Al-Najada et al., "Autonomous vehicles safe-optimal trajectory selection based on big data analysis and predefined user preferences," 2016 IEEE 7th Annual Ubiquitous Computing, Electronics & Mobile Communication Conference (UEMCON), New York, NY, 2016, pp. 1-6.

APGDT002, Microchip Technology Inc. http://www.microchip.com/, retrieved on: Nov. 3, 2017, 2 pages.

Bergenhem et al. "Overview of Platooning Systems", ITS World Congress, Vienna, Oct. 22-26, 2012, 8 pages.

Bhat "Travel Modeling in an Era of Connected and Automated Transportation Systems: An Investigation in the Dallas-Fort Worth Area," Techinal Report 122, Center for Transportation Research, Feb. 2017 [retrieved on Sep. 3, 2019]. Retrieved from the Internet: <URL:http://www.caee.utexas.edu/prof/bhat/REPORTS/DSTOP_122.pdf> pp. 1-61.

Conduent™—Toll Collection Solutions, https://www.conduent.com/solution/transportation-solutions/electronic-toll-collection/, retrived on: Nov. 3, 2017, 3 pages.

Doshi Review of the book "Security for Cloud Storage Systems" MEFHI, Gauridad Campus, India, 2014, pp. 1-2 [retrieved on Sep. 5, 2019]. Retrieved from the Internet: <URL:https://www.iacr.org/books/2014_sp_yang_cloudstorage.pdf.

EyEQ4 from Mobileye, http://www.mobileye.com/our-technology, retrieved on Nov. 3, 2017, 6 pages.

Fehr-Peers "Effects of Next Generation Vehicles on Travel Demand and Highway, Capacity, "FP Think: Effects of Next-Generation Vehicles on Travel Demand and Highway Capacity Feb. 2014, [retrieved on Jun. 13, 2019]. Retrived from the Internet: <URL:http://www.fehrandpeers.com/wp-content/uploads/2015/07/FP_Thing_Next_Gen_White_Paper_FINAL.pdf>pp. 1-39.

Flammini et al. "Wireless sensor networking in the internet of things and cloud computing era." Procedia Engineering 87 (2014): 672-679.

Fleetmatics https://www.fleetmatics.com/, retrieved on: Nov. 3, 2017, 6 pages.

HDL-64E of Velodyne Lidar, http://velodynelidar.com/index.html, retrieved on: Nov. 3, 2017, 10 pages.

Here, https://here.com/en/products-services/products/here-hd-live-map, retrieved on: Nov. 3, 2017, 5 pages.

Johri et al.,"A Multi-Scale Spatiotemporal Perspective of Connected and Automated Vehicles: Applications and Wireless Networking," in IEEE Intelligent Transportation Systems Magazine, vol. 8, No. 2, pp. 65-73, Summer 2016.

Maaß et al., "Data Processing of High-rate low-voltage Distribution Grid Recordings for Smart Grid Monitoring and Analysis," EURASIP Journal on Advances in Signal Processing (2015) 2015:14 DOI 10.1186/s13634-015-02034[retrieved on Sep. 3, 2019]. Retrieved from the Internet: <URL:https://link.springer.com/content/pdf/10.1186%2Fs13634-015-0203-4.pdf> pp. 1-21.

Miami Dade Transportation Planning Organization "First Mile-Last Mile Options with High Trip Generator Employers." MiamiDadeTPO.org. pp. 1-99 Jan. 31, 2018, [retrieved on Jun. 13, 2019]. Retrieved from the Internet:<URL:http://www.miamidadetpo.org/library/studies/first-mile-last-mile-options-with-high-trip-generator-employers-2017-12.pdf>.

MK5 V2X ,Cohda Wireless,http://cohdawireless.com, retrieved on: Nov. 3, 2017, 2 pages.

National Association of City Transportation Officials. "Blueprint for Autonomous Urbanism". New York, NY10017, www.nacto.org, Fall 2017, [retrieved on Sep. 5, 2019]. Retrieved from the Internet: <URL:https://nacto.org/wp-content/uploads/2017/11/BAU_Mod1_raster-sm.pdf>.

Optical Fiber from Cablesys, https://www.cablesys.com/fiber-patch-cables/?gclid=Cj0KEQjwldzHBRCfg_almKrf7N4BEiQABJTPKH_q2wbjNLGBhBVQVSBogLQMkDaQdMm5rZtyBaE8uuUaAhTJ8P8HAQ, retrieved on: Nov. 3, 2017, 10 pages.

Portland "Portland Metro Area Value Pricing Feasibility Analysis" Oregon Department of Transportation, Jan. 23, 2018, pp. 1-29, [retrieved on Jun. 13, 2019]. Retrived from the Internet: <URL:https://www.oregon.gov/ODOT/KOM/VP-TM2-InitialConcepts.PDF>.

Products for Toll Collection—Mobility—Siemens—Siemens, https://www.mobility.siemens.com/mobility/global/en/urban-mobility/road-solutions/toll-systems-for-cities/products-for-toll-collection/pages/products-for-toll-collection.aspx, retrieved on: Nov. 3, 2017, 2 pages.

R-Fans_16 from Beijing Surestar Technology Co. Ltd, http://www.isurestar.com/index.php/en-product-product.html#9, retrieved on: Nov. 3, 2017, 7 pages.

Society of Automotive Engineers International's new standard J3016: "(R) Taxonomy and Definitions for Terms Related to Driving Automation Systems for On-Road Motor Vehicles" 2016, downloaded Dec. 12, 2016, 30 pages.

Society of Automotive Engineers International's new standard J3016: "Taxonomy and Definitions for Terms Related to On-Road Motor Vehicle Automated Driving Systems" 2014, downloaded Sep. 17, 2019, 12 pages.

Southwest Research Institute, Basic Infrastructure Message Development and Standards Support for Connected Vehicles Applications, Apr. 24, 2018. {retrieved on Sep. 3, 2019}. Retrieved from the Internet: <URL:http://www.cts.virginia.edu/wp-content/uploads/2018/12/Task4-Basic-Infrastructure-Message-Development-20180425-Final.pdf> pp. 1-76.

STJ1-3 from Sensortech, http://www.whsensortech.com/, retrieved on Nov. 3, 2017, 2 pages.

StreetWAVE from Savari, http://savari.net/technology/road-side-unit, retrieved on: Nov. 3, 2017, 2 pages.

Surakitbanharn "Connected and Autonomous Vehicles: A Policy Review" Purdue Policy Research Institute, Feb. 2018, retrieved on Sep. 3, 2019, retrived from the interned: <URL:https://www.purdue.edu/discoverypark/ppri/docs/CATV%20Policy%20Writeup%20Feb%202018.pdf> pp. 1-17.

TDC-GPX2 Lidar of precision-measurement-technologies, http://pmt-fl.com, retrieved on: Nov. 3, 2017, 2 pages.

Teletrac Navman http://drive.teletracnavman.com/, retrieved on: Nov. 3, 2017, 2 pages.

(56) References Cited

OTHER PUBLICATIONS

Vector CANalyzer9.0 from vector https://vector.com, retrieved on Nov. 3, 2017, 1 page.
Williams "Transportation Planning Implications of Automated/Connected Vehicles on Texas Highways" Texas A&M Transportation Institute, Apr. 2017, 34 pages.
International Search Report of related PCT/US2018/012961, dated May 10, 2018, 16 pages.
International Search Report of related PCT/US2019/016606, dated Apr. 23, 2019, 21 pages.
International Search Report of related PCT/US2019/016603, dated Apr. 24, 2019, 17 pages.
International Search Report of related PCT/US2019/031304, dated Aug. 9, 2019, 17 pages.
International Search Report of related PCT/US2019/026569, dated Jul. 8, 33 pages.
International Search Report of related PCT/US2019/037963, dated Sep. 10, 2019, 54 pages.
International Search Report of related PCT/US2019/041004, dated Oct. 3, 2019, 18 pages.
International Search Report of related PCT/US2019/040814, dated Oct. 8, 2019, 20 pages.
International Search Report of related PCT/US2019/041008, dated Oct. 8, 2019, 16 pages.
International Search Report of related PCT/US2019/040819, dated Oct. 17, 2019, 41 pages.
International Search Report of related PCT/US2019/039376, dated Oct. 29, 2019, 11 pages.
International Search Report of related PCT/US2019/040809, dated Nov. 15, 2019, 17 pages.

\* cited by examiner

I: Contribution/Utility of Infrastructure Intelligence
V: Contribution/Utility of Vehicle Intelligence

SYSTEMS AND METHODS FOR DRIVING INTELLIGENCE ALLOCATION BETWEEN VEHICLES AND HIGHWAYS

This application claims priority to U.S. provisional patent application Ser. No. 62/669,215, filed May 9, 2018, which is incorporated herein by reference in its entirety.

FIELD

The present invention relates to systems and methods that allocate, arrange, and distribute certain types of functions and intelligence, for connected automated vehicle highway (CAVH) systems, to facilitate vehicle operations and controls, to improve the general safety of the whole transportation system, and to ensure the efficiency, intelligence, reliability, and resilience of CAVH systems. The present invention also provides methods to define CAVH system intelligence and its levels, which are based on two dimensions: the vehicle intelligence and infrastructure intelligence.

BACKGROUND

Autonomous vehicles, which are capable of sensing the environment, detecting obstacles, and navigating without human effort, are in development stage. Presently, autonomous vehicles have been put into field tests, but they have not been put into wide-spread commercial use. Existing approaches for autonomous vehicles require expensive and complicated on-board systems, multiple sensing systems, and highly rely on the vehicle sensors and control, which makes their implementation a substantial challenge.

Alternative systems and methods that address these problems are describe in U.S. patent application Ser. No. 15/628,331, filed Jun. 20, 2017, and U.S. Provisional Patent Application Ser. Nos. 62/626,862, filed Feb. 6, 2018, 62/627,005, filed Feb. 6, 2018, and 62/655,651, filed Apr. 10, 2018, the disclosures of which are herein incorporated by reference in their entireties (referred to herein as a CAVH system).

The inventions described herein provide systems and intelligence allocation methods for different combination of Intelligent Road Infrastructure System (IRIS) and vehicle automation to achieve transportation and vehicle systems performance, which facilitates vehicle operations and control for automated vehicle highway (CAVH) systems to behave optimally and robustly. The description below describes the general CAVH system and intelligence allocation methods to achieve certain system performance, and provides illustrative detailed methods for this vehicle and transportation integrated system.

SUMMARY

The present invention relates to systems and methods that allocate, arrange, and distribute certain types of functions and intelligence, for connected automated vehicle highway (CAVH) systems, to facilitate vehicle operations and controls, to improve the general safety of the whole transportation system, and to ensure the efficiency, intelligence, reliability, and resilience of CAVH systems. The present invention also provides methods to define CAVH system intelligence and its levels, which are based on two dimensions: the vehicle intelligence and infrastructure intelligence.

For example, in some embodiments, provided herein is a connected and automated vehicle highway (CAVH) system comprising sensing, communication, and control components connected through segments and nodes that manage an entire transportation system. In some embodiments, the vehicles managed within the CAVH system comprise CAVH vehicles and non-CAVH vehicles. In some embodiments, the CAVH vehicles and non-CAVH vehicles comprise manual vehicles, automated vehicles, and connected vehicles.

In some embodiments, the segments and nodes have overlapping sensing and control areas with neighboring segment and nodes to hand off CAVH vehicles between neighboring segments and nodes.

In some embodiments, the CAVH system comprises four control levels: a) vehicle; b) road side unit (RSU); c) traffic control unit (TCU); and d) traffic control center (TCC).

In some embodiments, the vehicle control level comprises vehicles having on on-board system or application to operate a vehicle dynamic system to achieve on-road coordinate commands from an RSU.

In some embodiments, the RSU level involves segments or nodes managed by an RSU responsible for the sensing and control of vehicles. In some embodiments, the sensing comprising information from LiDAR and/or radar sensors or employs computer vision or other related systems that are deployed to fully capture information in a segment or node. In some embodiments, the RSU, in response to the sensing, manages collision avoidance, routing execution, lane change coordination, and high-resolution guidance commands in terms of on-road coordinates for vehicles to execute their automated driving.

In some embodiments, the TCU level involves multiple RSUs manages by a TCU. In some embodiments, the TCU is responsible for updating a dynamic map of moving objects and coordinated control among RSUs for continuous automated driving. In some embodiments, multiple TCUs are connected through TCCs to cover a region or subnetwork.

In some embodiments, the TCC level comprises high-performance computing and cloud services responsible for managing overall routing plans and updating a dynamic map of congestion, incidents, inclement weather, and events with regional impact. In some embodiments, the TCC level is further responsible for managing connecting with other application services including, but not limited to, payment and transaction systems, regional traffic management centers (TMCs), and third-party applications (e.g., government applications, private corporate applications, etc.). In some embodiments, multiple TCCs are employed to facilitate CAVH driving between or across large metropolitan areas.

For example, in some embodiments, provided herein is a connected and automated vehicle highway (CAVH) system comprising sensing, communication, and control components that allocate, arrange, and distribute functions and intelligence that facilitate vehicle operations and controls. In some embodiments, the components improve safety of a transportation system comprising the components. In some embodiments, the components improve efficiency, intelligence, reliability, and/or resilience of the CAVH systems. In some embodiments, the allocated functions comprise sensing. In some embodiments, the allocated functions comprise transportation behavior prediction and management. In some embodiments, the allocated functions comprise planning and decision making. In some embodiments, the allocated functions comprise vehicle control.

In some embodiments, the CAVH system that comprises the sensing, communication, and control components that allocate, arrange, and distribute functions and intelligence that facilitate vehicle operations and controls comprises one or more subsystems: a) an intelligent road infrastructure system (IRIS) comprising one or more of roadside units (RSUs), network and Traffic Control Units (TCUs), and Traffic Control Centers (TCCs); and b) vehicles with an onboard unit (OBU).

In some embodiments, the CAVH system is supported by one or more of: a) real-time communication via wired and wireless media; b) a power supply network; and c) a cyber safety and security system.

In some embodiments, the allocation of functions and intelligence that facilitate vehicle operations and controls is based on the following dimensions: a) vehicle dimension; b) infrastructure dimension; and c) system dimension.

In some embodiments, the system is configured to manage functions and intelligence in any one of a combination of different automation levels at each of the dimensions. In some embodiments, the system is configured to assess a particular level of automation present at any dimension and to select the appropriate allocation of functions and intelligence to optimally manage infrastructure and vehicles operating under such conditions.

In some embodiments, the vehicle dimension comprises the following levels of automation: a) A0: No automation functions; b) A1: Basic functions to assist a human driver controlling a vehicle; c) A2: Assists human driver controlling a vehicle for simple tasks and has basic sensing functions; d) A3: Functions to sense the environment in detail and in real-time, and can handle relative complicated driving task; e) A4: Functions to allow vehicles driving independently under limited conditions and sometimes with human drivers' backup; and f) A5: Functions to allow vehicles driving independently without human drivers' backup for all conditions.

In some embodiments, the infrastructure dimension comprises the following levels of automation: a) I0: No functions; b) I1: Information collection and traffic management wherein the infrastructure provides primitive sensing functions in terms of aggregated traffic data collection and basic planning and decision making to support simple traffic management in low spatial and temporal resolution; c) I2: I2X and vehicle guidance for driving assistance, wherein, in addition to functions provided in I1, the infrastructure realizes limited sensing functions for pavement condition detection and vehicle kinematics detection, such as lateral/longitudinal position/speed/acceleration, for a portion of traffic, in seconds or minutes; the infrastructure also provide traffic information and vehicle control suggestion and instructions for the vehicle through I2X communication; d) I3: Dedicated lane automation, wherein the infrastructure provides individual vehicles with dynamics of surrounding vehicles and other objectives in milliseconds, and supports full automated driving on CAVH-compatible vehicle dedicated lanes; the infrastructure has limited transportation behavior prediction capability; I4: Scenario-specific automaton wherein the infrastructure provides detailed driving instructions for vehicles to realize full automation driving on certain scenarios/areas, such as locations such as predefined geo-fenced areas, where the traffic is mixed by CAVH compatible and non-compatible vehicles; essential vehicle-based automation capability, such as emergency braking, is standing by as a backup system in case the infrastructure fails; and f) I5: Full infrastructure automation wherein infrastructure provides full control and management for individual vehicles for all scenarios and optimizes a whole network where the infrastructure is deployed; vehicle automation functionality is not necessary as a backup; full active safety functions are available.

In some embodiments, the system dimension comprises the following levels of automation: a) S0: no function; b) S1: the system maintains a simple function for individual vehicle such as cruise control and passive safety function; the system detects the vehicle speed and distance; c) S2: the system behaves with individual intelligence and detects vehicle functioning status, vehicle acceleration, traffic sign and signal; individual vehicles make decisions based on their own information, and have partial driving automation complicated functions such as assisting the vehicle's adaptive cruise control, lane keeping, lane changing, and automatic parking; d) S3: the system integrates information between a group of vehicles, and behaves with ad-hoc intelligence with prediction capability, the system has intelligence for decision making for the group of vehicles and can handle complicated conditional automation driving tasks such as cooperative cruise control, vehicle platooning, vehicle passing intersection, merging, and diverging; e) S4: the system integrates driving behavior optimally within a partial network; the system detects and communicates detailed information within the partial network, and makes decisions based on both vehicle and transportation information within the network and handles high driving automation tasks such as passing signal corridors and provides optimal trajectory within a small transportation network; f) S5: vehicle automation and system traffic automation, wherein the system behaves optimally within a whole transportation network; the system detects and communicates detailed information within the large transportation network, and makes decisions based on all available information within the network; the system handles full driving automation tasks including individual vehicle task, transportation tasks, and coordinates all vehicles.

In some embodiments, the system dimension is dependent on the two dimensions: 1) vehicle; and 2) infrastructure, represented by the following equation (S=system automation; V=vehicle intelligence; and I=infrastructure intelligence): S=f(V, I). In some embodiments, the equation is a non-linear function, wherein system automation level 2, comprises, for example: a) Sensing: the vehicle sub-system dominates; the infrastructure sub-system helps to complete the driving environment; b) Transportation behavior prediction and management: the vehicle sub-system dominates; the infrastructure sub-system mainly coordinated with vehicle sub-system; c) Planning and decision making: the vehicle sub-system is a major part; the infrastructure sub-system optimizes the system from a global perspective; and d) Vehicle control: the vehicle sub-system is dominant; the infrastructure sub-system supports vehicle control command.

The systems may be implemented under a variety of different method, depending on the level of automation present in the different dimensions. For example, in some embodiments (method 1), the control components allocate, arrange, and distribute intelligence such that functions are assigned to vehicles, wherein automated vehicles and infrastructure have no communication and function independently and wherein the infrastructure provides no improvement upon vehicle intelligence, which may be applied to an S1 scenario.

In other embodiments (method 2), the control components allocate, arrange, and distribute intelligence such that functions are mostly allocated into vehicle subsystems, and vehicles play a dominant role; wherein a road side device subsystem only takes supplementary responsibility for simple tasks and helps the vehicles maintain certain speeds and provide collision warnings; wherein when there is control decision conflict, the vehicles make a decision; which may be applied to S1 or S2 scenarios.

In other embodiments (method 3) control components allocate, arrange, and distribute intelligence such that functions are flexibly assigned to both vehicle and infrastructure subsystems; wherein either infrastructure or vehicle subsystems play a dominant role in sensing and decision making; wherein a road side device subsystem helps vehicles to make decisions based on local environment, to make control suggestions for vehicles to operate for: a) following strategies, b) lane keep strategies, c) lane changing strategies, d) merging and diverging strategies, and e) passing intersections; wherein when there is control decision conflict, the vehicle makes a control decision either made by itself or using information from the infrastructure; which may be applied to S2 or S3 scenarios.

In other embodiments (method 4), control components allocate, arrange, and distribute intelligence such that functions are mostly distributed to a road side device subsystem, and infrastructure plays a dominant role in control decisions; wherein vehicle subsystems still have basic functions such as collision avoidance; wherein vehicles follow all information provided by the infrastructure, and wherein when there is control decision conflict, the vehicles make control decisions made by the infrastructure; which may be applied to S3 or S4 scenarios.

In other embodiments (method 5) control components allocate, arrange, and distribute intelligence such that all functions rely on a road side subsystem and vehicles have the capability to communicate and follow orders; wherein all vehicles are controlled by the infrastructure system and wherein decisions are made by and communicated with the system through a road side devices network, which may be applied to S4 or S5 scenarios.

In some embodiments, the control components manage a mixed traffic flow of vehicles at different levels of connectivity and automation. In some embodiments, the control components collect vehicle generated data, such as vehicle movement and condition, sends collected data to RSUs, and receives inputs from an IRIS; wherein based on the inputs from the IRIS, an OBU facilitates vehicle control; wherein if a vehicle control system fails, the OBU may take over in a short time period to stop the vehicle safely.

In some embodiments, the IRIS facilitates vehicle operations and control for a CAVH systems; wherein said IRIS provides individual vehicles with detailed customized information and time-sensitive control instructions for vehicles to fulfill driving tasks, such as car following, lane changing, and route guidance; and provides operations and maintenance services for vehicles on both freeways and urban arterials.

In some embodiments, the IRIS is built and managed as an open platform and its own subsystems, as listed below, are owned and/or operated by different entities, and are shared among different CAVH systems physically and/or logically, including one or more or all of the following physical subsystems: a. a roadside unit (RSU) network, whose functions include sensing, communication, control (fast/simple), and drivable ranges computation; b. a Traffic Control Unit (TCU) and Traffic Control Center (TCC) network; c. vehicle onboard units (OBU) and related vehicle interfaces; d. traffic operations centers; and e. cloud-based platform of information and computing services. In some embodiments the system realizes one or more of the following function categories: i. sensing; ii. transportation behavior prediction and management; iii. planning and decision making; and iv. vehicle control.

The systems and methods may include and be integrated with functions and components described in U.S. patent application Ser. No. 15/628,331, filed Jun. 20, 2017, and U.S. Provisional Patent Application Ser. Nos. 62/626,862, filed Feb. 6, 2018, 62/627,005, filed Feb. 6, 2018, and 62/655,651, filed Apr. 10, 2018, the disclosures of which are herein incorporated by reference in their entireties.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

DRAWINGS

The patent or application file contains at least one drawing executed in color. Copies of this patent or patent application publication with color drawings will be provided by the Office upon request and payment of the necessary fee.

FIG. 1 provides a graph showing the non-linear combination levels of system automation and intelligence.

DETAILED DESCRIPTION

Exemplary embodiments of the technology are described below. It should be understood that these are illustrative embodiments and that the invention is not limited to these particular embodiments.

Figure 1:
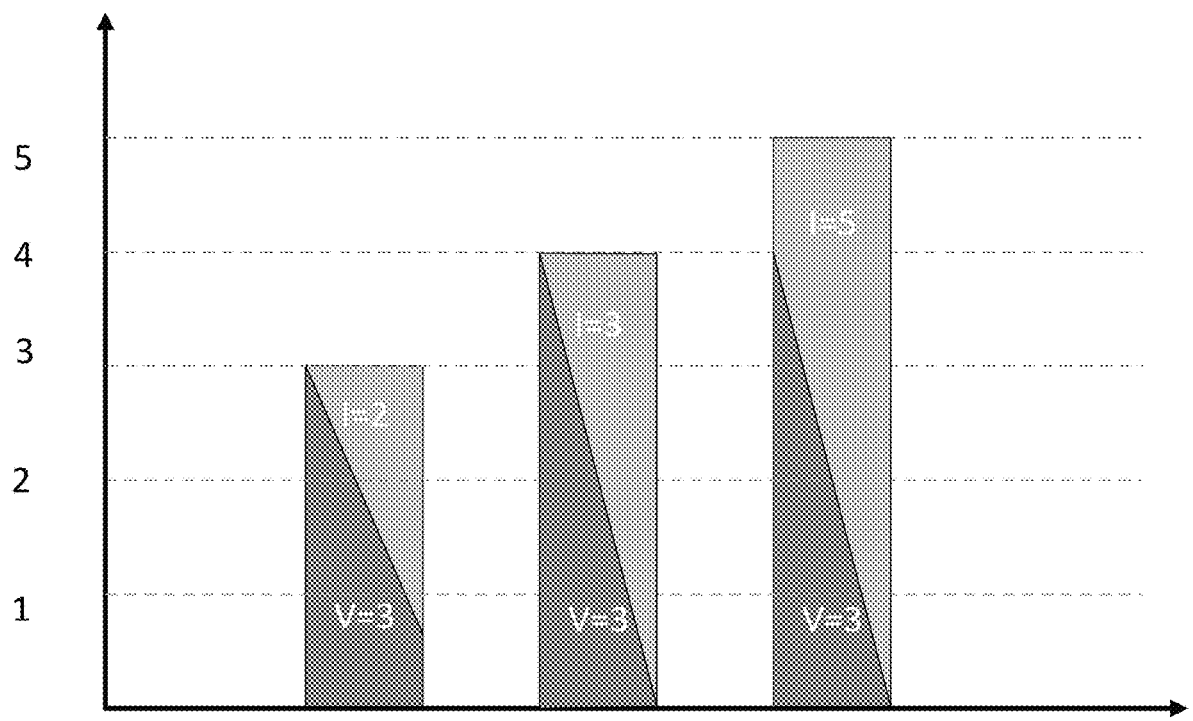

FIG. 1 provides a graph showing that the automation level of the system is the combination of the vehicle automation level and infrastructure automation level. The level of the global system is not limited to a direct combination of the degrees of both subsystems. The functions of the global system are distributed to vehicle sub-systems and infrastructure sub-systems.

This system realizes following function categories: a) Sensing; b) Transportation behavior prediction and management; c) Planning and decision making; and d) Vehicle control.

Figure 2:
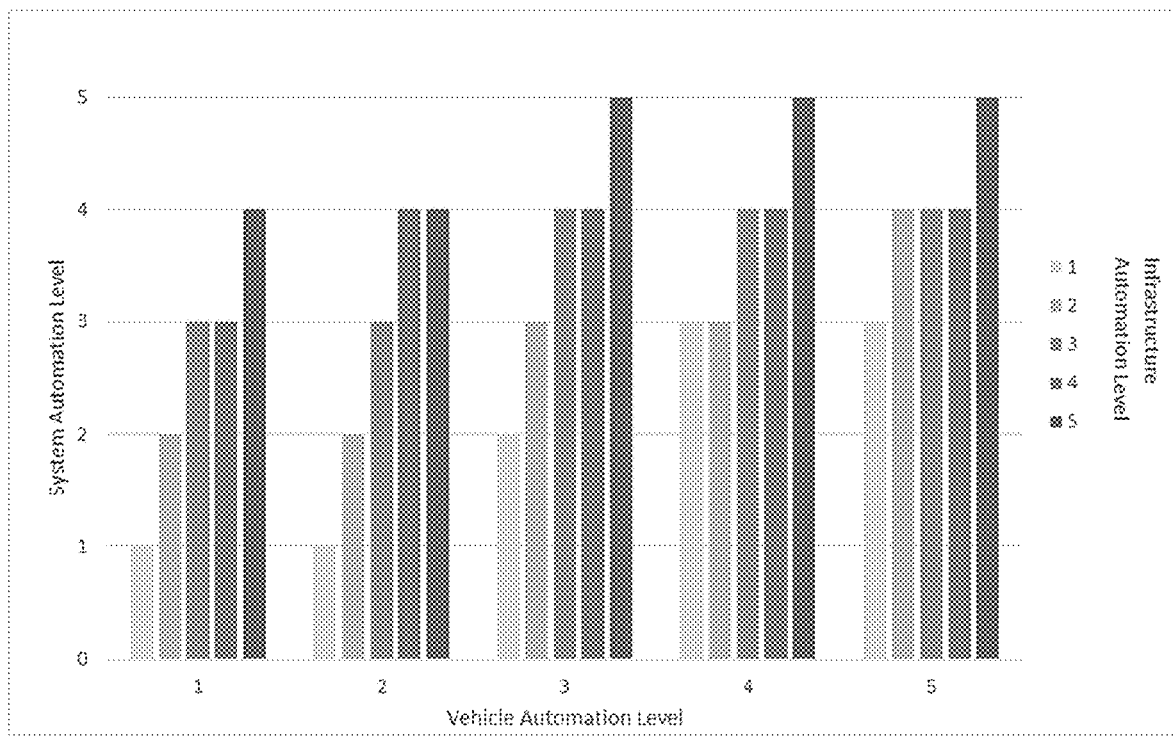
FIG. 2 shows two and three dimensional graphs of system intelligence levels plotting system automation level versus vehicle automation level and infrastructure automation level.
Figure 2:
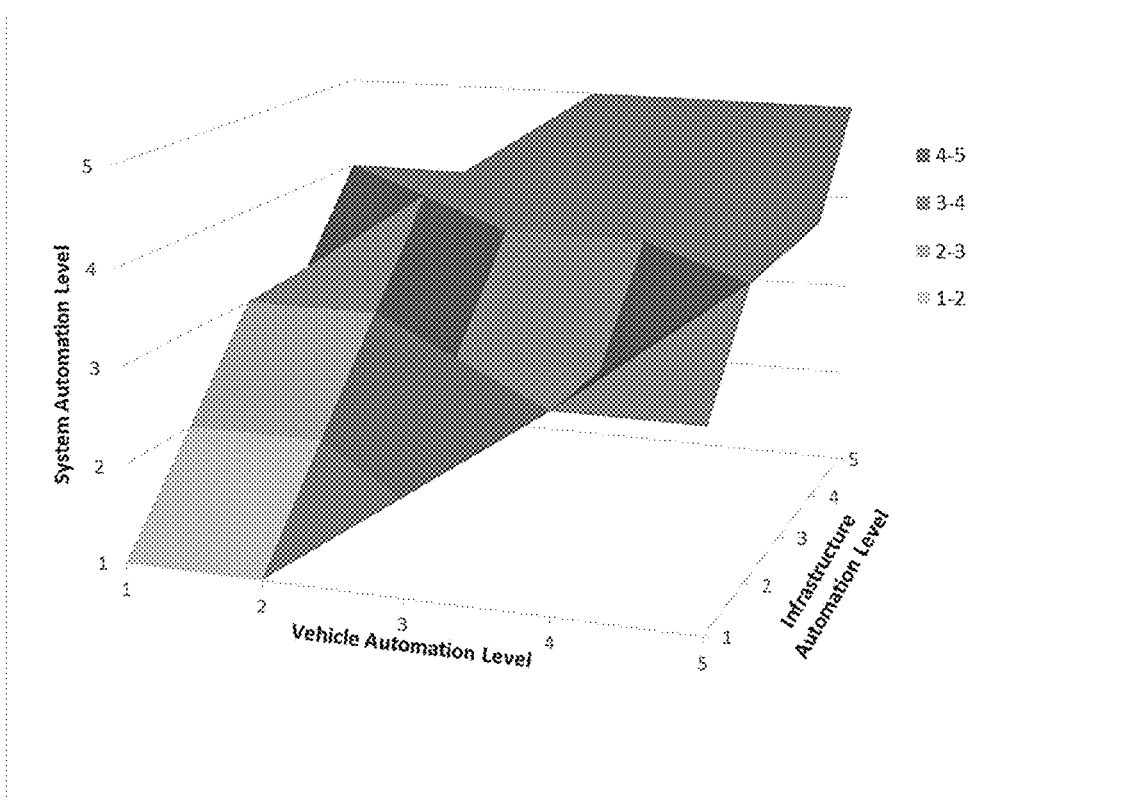

FIG. 2 shows two- and three-dimensional graphs showing the relationship between system automation level relative to vehicle automation level and infrastructure automation level. Table 1 below provides an additional representation with the numbers in each row and column representing the system dimension for each vehicle and infrastructure automation level combination.

TABLE 1

Exemplary system intelligence level determination

| | | Vehicle Automation Level | | | | |
|---|---|---|---|---|---|---|
| | | 1 | 2 | 3 | 4 | 5 |
| Infrastructure | 1 | 1 | 1 | 2 | 3 | 3 |
| Automation Level | 2 | 2 | 2 | 3 | 3 | 4 |
| | 3 | 3 | 3 | 4 | 4 | 4 |
| | 4 | 3 | 4 | 4 | 4 | 4 |
| | 5 | 4 | 4 | 5 | 5 | 5 |

Figure 3:
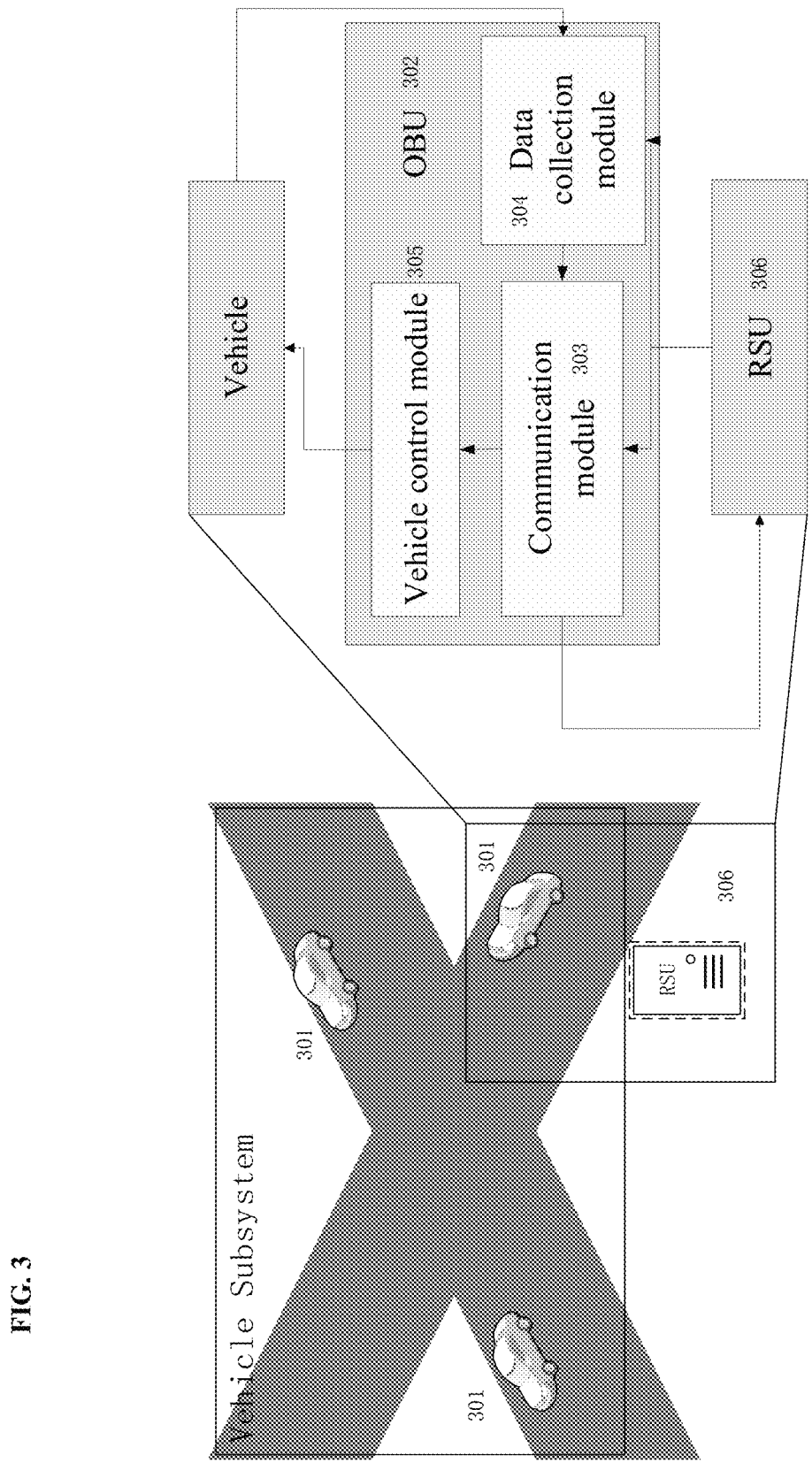
FIG. 3 shows an exemplary vehicle subsystem.

FIG. 3 shows an exemplary vehicle subsystem having components:
301—Vehicle.
302—OBU: on-board unit that controls the vehicle and collects and sends data.
303—Communication module: that transfers data between RSUs and the OBU.
304—Data collection module: that collects data of the vehicle dynamic and static state and generated by humans.
305—Vehicle control module: that executes control commands from RSUs. When the control system of the vehicle is damaged, it can take over control and stop the vehicle safely.
306—RSU: roadside units that collect and send data.

As shown in FIG. 3, a vehicle subsystem comprises all vehicles 301 in CAVH system. For each vehicle, the OBU 302 contains a communication module 303, data collection module 304, and vehicle control module 305. The data collection module collects data from the vehicle and inputs from human drivers, and then sends it to RSU 306 through the communication module. Also, the OBU receives data of the RSU through the communication module. Based on the data from the RSU, the vehicle control module assists to control the vehicle.

FIG. 1 shows an exemplary Intelligent Road Infrastructure System (IRIS) having components:
401—Macroscopic TCC/TOC: highest-level TCC/TOC that manages regional TCCs.
402—Regional TCC: high-level TCC that manages corridor TCCs.
403—Corridor TCC: mid-level TCC that manages segment TCUs.
404—Segment TCU: low-level TCU that manages point TCUs.
405—Point TCU: lowest-level TCU that manages RSUs.

Figure 4:
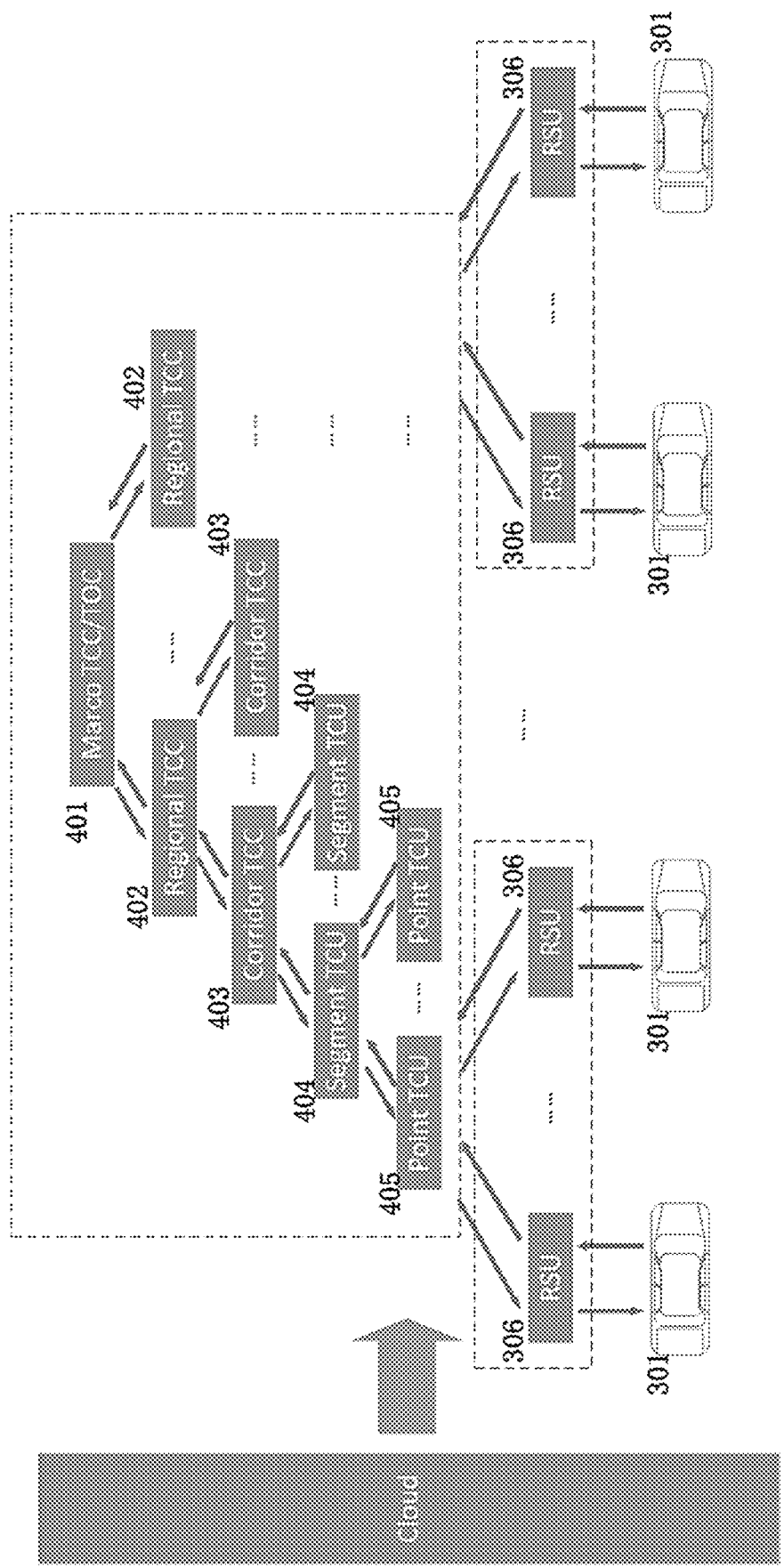
FIG. 4 shows an exemplary IRIS configuration.

FIG. 4 shows the structure of an exemplary IRIS. A macroscopic TCC 401, which may or may not collaborate with an external TOC 401, manages a certain number of regional TCCs 402 in its coverage area. Similarly, a regional TCC manages a certain number of corridor TCCs 403, a corridor TCC manages a certain number of segment TCUs 404, a segment TCU manages a certain number of point TCUs 405, and a point TCUs manages a certain number of RSUs 306. An RSU sends customized traffic information and controls instructions to vehicles 301 and receives information provided by vehicles. Moreover, in the example shown, the IRIS is supported by cloud services.

Three exemplary approaches comprise:
1. Autonomous vehicles approach;
2. Connected and automated vehicles approach, with the assistance of V2I and V2V technologies; and
3. CAVH-IRIS, infrastructure-based approach with sensing, prediction, and decision making from roadside systems.

Approach 1 has decades of history. There are several exemplary methods to support this approach, such as those described in U.S. Pat. No. 9,120,485 (The autonomous vehicle is configured to follow a baseline trajectory. The vehicle's computer system receives changes to trajectory and optimizes new trajectory for the vehicle), U.S. Pat. No. 9,665,101 (The system determines a route from a current location to a destination for the vehicle), and U.S. Pat. No. 9,349,055 (Used for the Google autonomous vehicle to detect other vehicles when it tries to sense the environment), and US Publ. No. 20170039435 (Used for the Google autonomous vehicle to detect traffic signals when it tries to sense the environment), each of which is herein incorporated by reference in their entireties. The products and their technologies developed by vehicle manufactures and AI research groups have been implemented. However, the approach lacks the planning and decision-making from the perspective of global optimization. The human drivers can be substituted by autonomous driving AI but cannot achieve better performance in terms of transportation systems. The approach also suffers from insufficient sensing range, insufficient computing capabilities of the vehicles, and does not suffice to address the complexity and limit that will be confronted in the future.

Figure 5:
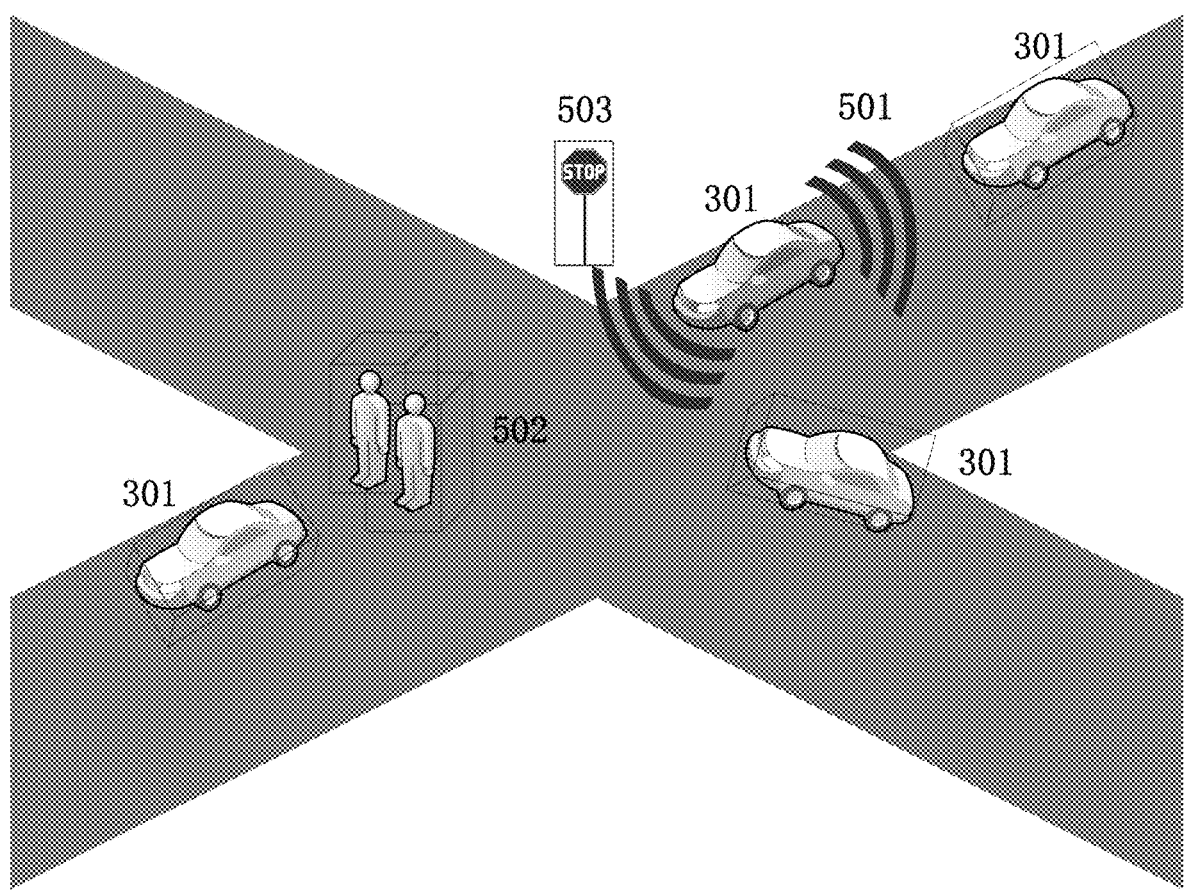
FIG. 5 shows an exemplary AV-only approach.

FIG. 5 shows and exemplary AV-Only Approach having components:
501—Sensors on vehicles.
502—Pedestrians on road.
503—Roadside infrastructures.

FIG. 5 shows how automated vehicles 301 work in this approach. The AV is continuously sensing the environment with multiple sensors 501 when it is on the road. The environment includes other vehicles 301 around it, the pedestrians 502, the road infrastructures 503 and others. In this example, the AV detects the two pedestrians in front of it, the three vehicles around it, and a stop sign at the intersection. With the information it obtains, the AV make decisions and operates properly and safely on the road.

Connected and automated vehicles approach, with the assistance of communications. The approach has been attempted for a few years. Some prototypes are already developed, such as those described in US 2012/0059574 (The vehicle unit transmits a vehicle speed to the roadside unit, when in wireless communication range. The roadside unit transmits the vehicle speed to the traffic controller. The traffic controller receives vehicle speed data from a plurality of vehicles, and determines a suggested speed for each vehicle) and U.S. Pat. No. 7,425,903 (In this grid system, a motor vehicle is equipped with a transmitter, receiver, computer and a selection of sensors. Other adjacent vehicles also contain the same of equipment for transmitting and receiving signals. When the sensors in a vehicle detect a change such as hard braking (rapid deceleration) or very slow speed (blockages), it automatically sends this information via the transmitter over a wireless communication channel to any other receivers in the vicinity), herein incorporated by reference in their entireties. With V2V and V2I communication technologies, the system can make relatively better performance than individual autonomous vehicles. However, without help from a system level intervention, the system cannot achieve overall system or global optimization. The approach also suffers limited sensing, storing, and computing capabilities.

Figure 6:
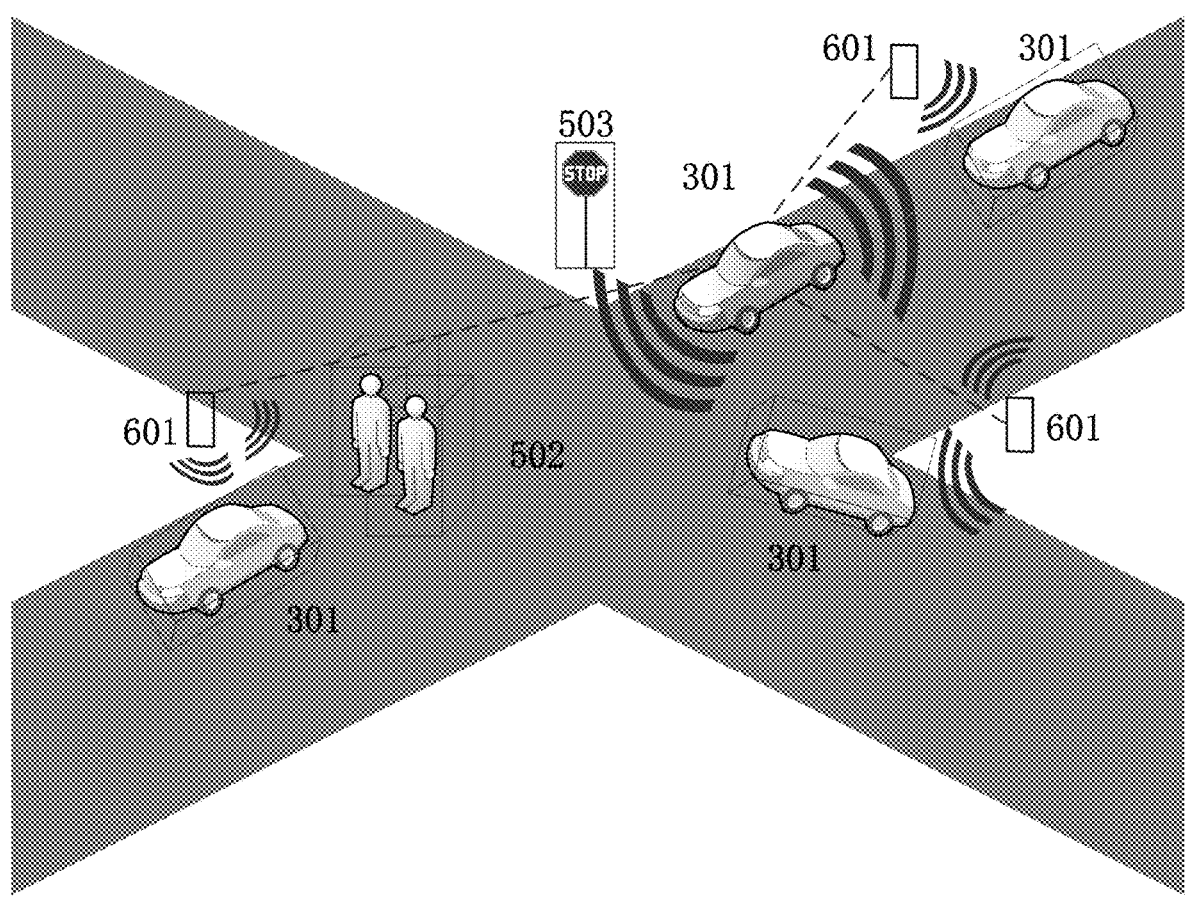
FIG. 6 shows an exemplary V2V- and V2I-based approach.

FIG. 6 shows exemplary V2V- and V2I-based approach comprising component 601: Roadside infrastructure facilitating communication. FIG. 6 shows how V2V- and V2I-based approach works. The approach has been employed for several years. Some prototypes have been developed. With V2V and V2I communications technologies, the system can make relatively better performance than individual autonomous vehicles. Each vehicle 301 receives the information detected by surrounding infrastructure 601 and other vehicles 301. The information includes cars, passengers, traffic situation, etc. With the provided information, a vehicle has an enhanced awareness of surrounding to make decisions. However, without help from a system level intervention, the system cannot achieve overall system or global optimization. The approach also suffers limited sensing, storing and computing capabilities.

Figure 7:
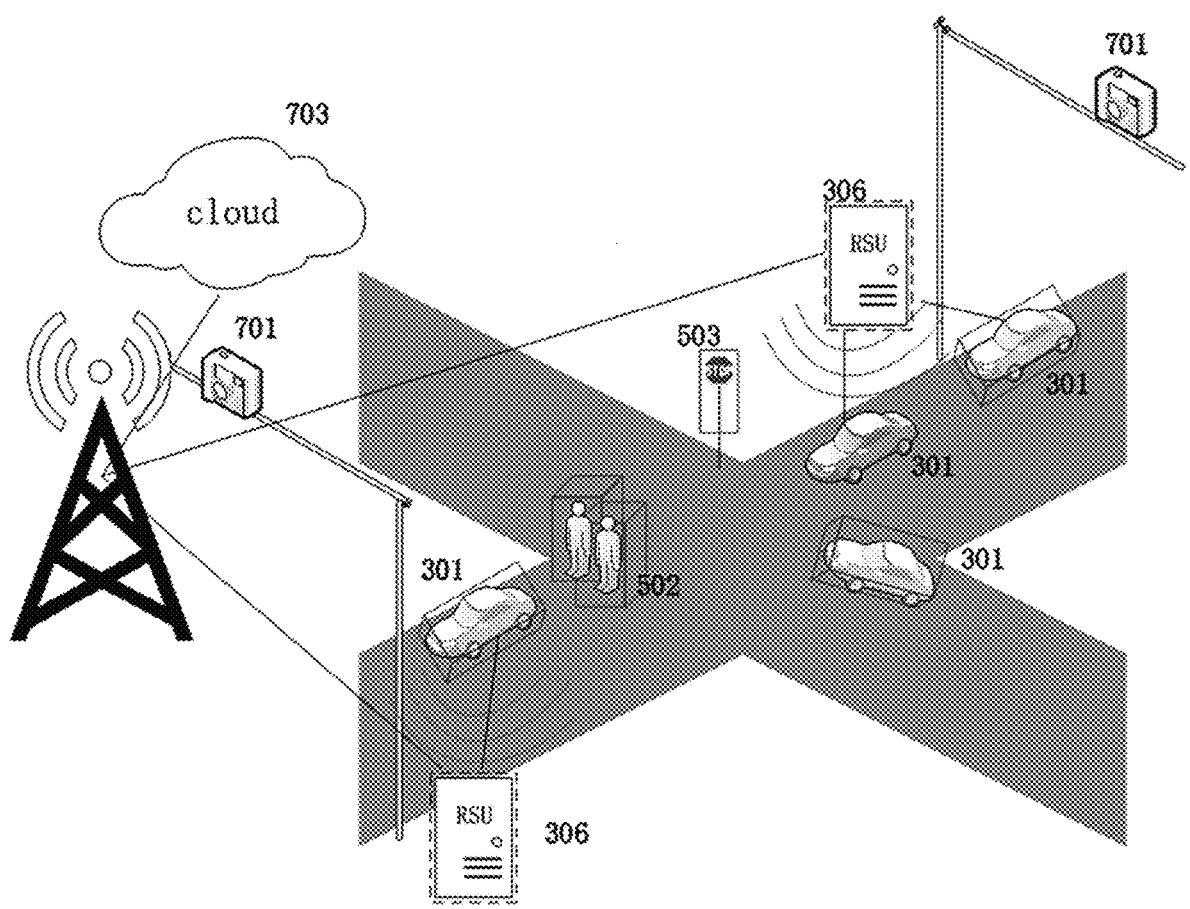
FIG. 7 shows an exemplary CAVH approach.

FIG. 7 shows an exemplary CAVH-IRIS approach. The system has the ability to make system-level optimum decisions, makes maneuvers to individual vehicles, and is beneficial for the overall transportation system. The system is configured with more powerful computing and storing capabilities but can suffer from limits in communication. The embodiment in FIG. 7 comprises components:
701—Roadside sensors.
702—Higher-level of IRIS.
703—Cloud: that assists data storage and computation.

FIG. 7 is a demonstration of the CAVH-IRIS approach. The RSU 306 in FIG. 7 uses sensors 701 on the road to senses the road, the vehicle 301, and the driving environment. The information is sent to higher level IRIS 702. The system, using the data from the sensors, can make system-level optimum decisions, can make maneuvers to individual vehicles, is beneficial for the overall transportation system. The system communicates with the OBU 302 to control the vehicles. The system can be configured with more powerful computing and storing capabilities by communicating with the cloud 703 as shown in FIG. 7.

Figure 8:
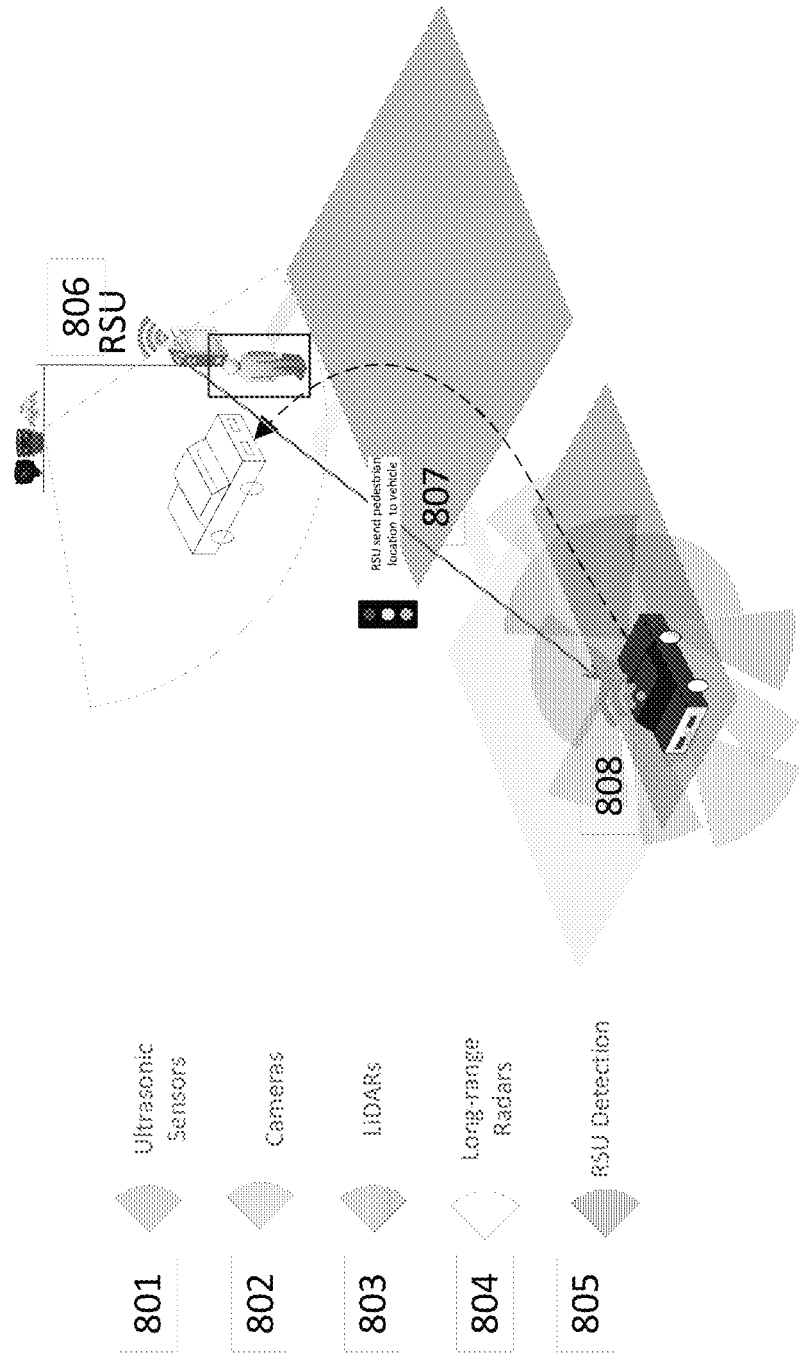
FIG. 8 shows an exemplary intelligence allocation approach at Level 2 system intelligence.

FIG. 8 shows an intelligence allocation example at Level 2 system intelligence comprising components:
801: Ultrasonic sensors on vehicle.
802: Cameras on vehicle.
803: LiDARs on vehicle.
804: Long-range radars on vehicle.
805: RSU detection area on vehicle.
806: Road side unit.
807: Communication between RSU and vehicle.
808: Vehicles in CAVH system.

FIG. 8 shows an example combination of intelligence distributed among the vehicle and infrastructure:

a) Sensing: The vehicle sub-system is the dominating part, which means the driving environment is primarily detected by sensors such as ultrasonic sensors 801, cameras 802, LiDARs 803, long-range radars 804 etc. that are located on the vehicle 808. Meanwhile, infrastructure sub-system 806 detects the traffic under the coverage area 805, and keeps communication with vehicle sub-system 807, and transmits the traffic information to complete the driving environment.

b) Transportation behavior prediction and management: Vehicle sub-system is the dominating part. The infrastructure sub-system mainly coordinates with the vehicle sub-system. It can predict the event from the macroscopic level, such as a long-distance traffic jam.

c) Planning and decision making: The vehicle sub-system is the major component. However, the infrastructure sub-system can suggest optimizing the system from the global perspective.

d) Vehicle control: The vehicle sub-system is the major component. The infrastructure sub-system only gives simple control commands that are judged by the vehicle sub-system. If the control command of two sub-systems conflict, the vehicle follows the instruction sent from the vehicle-subsystem. The system reports and stores the conflict event.

Figure 9:
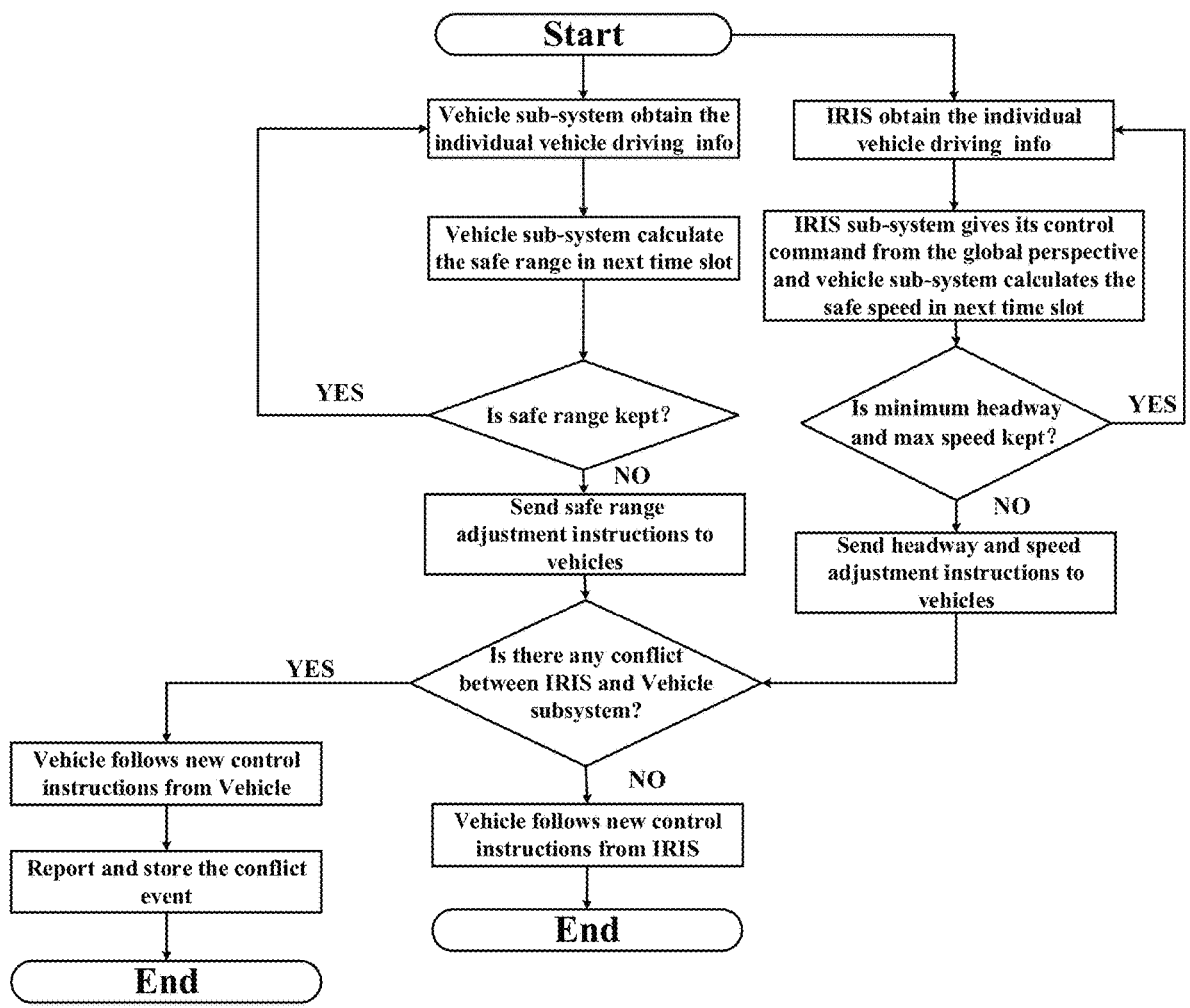
FIG. 9 shows an exemplary flow chart of vehicle control.

FIG. 9 shows that under the intelligence allocation method 2 above, vehicle sub-systems play a dominating role. Under this circumstance, vehicle-subsystems give a safety range to control the vehicle, and the IRIS sub-system gives its control command from the global perspective. The instruction from the IRIS must meet the safety range that are given by the vehicle. Otherwise, the vehicle follows the instruction sent from the vehicle sub-system. A conflicts record is stored and reported.

We claim:

1. A connected and automated vehicle highway (CAVH) system comprising:
  a vehicle subsystem comprising a vehicle having an onboard unit (OBU), wherein said vehicle subsystem operates at a vehicle intelligence level V; and
  an intelligent roadside infrastructure system (IRIS) comprising a hierarchy of traffic control units (TCU), traffic control centers (TCC), and roadside units (RSU), wherein said IRIS operates at an infrastructure intelligence level I,
  wherein:
  said CAVH system provides sensing; transportation behavior prediction and management; planning and decision making; and vehicle control;
  said TCU and/or TCC comprises control components (TCU/TCC control components) that generate time-sensitive vehicle control instructions and provide the vehicle control instructions to the OBU, wherein said vehicle control instructions comprise instructions for vehicle longitudinal and lateral position; and for vehicle speed, steering, and control; and said CAVH system operates at a system intelligence level S=1, 2, 3, 4, or 5 during vehicle operation by:

identifying the vehicle intelligence level V of said vehicle subsystem during vehicle operation and identifying the infrastructure intelligence level I of said IRIS during vehicle operation; and using the TCU/TCC control components to allocate functions and intelligence to the vehicle subsystem and to the IRIS to provide said CAVH system with system intelligence S so that the CAVH system manages the IRIS and the vehicles to facilitate vehicle operations and controls during vehicle operation.

2. The system of claim 1, wherein said CAVH system:

identifies a system intelligence level S to achieve;

identifies present levels of automation for I and V during vehicle operation; and uses the TCU/TCC control components to allocate driving functions and driving intelligence to the vehicle subsystem and to IRIS to achieve the system intelligence level S so that the CAVH system provides vehicle operation and control to vehicles during vehicle operation.

3. The system of claim 1, wherein allocating functions and intelligence to the vehicle subsystem and to the IRIS comprises allocating sensing functions to the vehicle subsystem and to the IRIS.

4. The system of claim 1, wherein allocating functions and intelligence to the vehicle subsystem and to the IRIS comprises allocating transportation behavior prediction and management functions to the vehicle subsystem and to the IRIS.

5. The system of claim 1, wherein allocating functions and intelligence to the vehicle subsystem and to the IRIS comprises allocating planning and decision making functions to the vehicle subsystem and to the IRIS.

6. The system of claim 1, wherein allocating functions and intelligence to the vehicle subsystem and to the IRIS comprises allocating vehicle control functions to the vehicle subsystem and to the IRIS.

7. The system of claim 1, wherein said CAVH system is supported by real-time communication over wired and/or wireless media; a power supply network; and a cyber safety and security system.

8. The system of claim 1, wherein identifying the vehicle intelligence level V during vehicle operation comprises:

identifying vehicle intelligence level V=0 for a vehicle providing no automation functions during operation;

identifying vehicle intelligence level V=1 for a vehicle providing assistance for controlling a vehicle during operation;

identifying vehicle intelligence level V=2 for a vehicle providing assistance for controlling a vehicle and comprising sensing functions during operation;

identifying vehicle intelligence level V=3 for a vehicle providing sensing functions that sense the environment in detail and in real-time and providing management of driving tasks during operation;

identifying vehicle intelligence level V=4 for a vehicle that drives autonomously for some conditions during operation; and/or identifying vehicle intelligence level V=5 for a vehicle that drives autonomously for all conditions during operation.

9. The system of claim 1, wherein identifying said infrastructure intelligence level I during vehicle operation comprises:

identifying infrastructure intelligence level I=0 for an IRIS providing no functions;

identifying infrastructure intelligence level I=1 for an IRIS providing aggregated traffic data collection and planning and decision making to support traffic management;

identifying assigning infrastructure intelligence level I=2 for an IRIS providing sensing functions for pavement condition detection and vehicle kinematics detection for a portion of traffic and providing traffic information and vehicle control suggestions and instructions for vehicles through I2X communication;

identifying infrastructure intelligence level I=3 for an IRIS providing individual vehicles with information describing the dynamics of surrounding vehicles and other objects, providing full automated driving on CAVH-compatible vehicle dedicated lanes, and providing transportation behavior prediction;

identifying infrastructure intelligence level I=4 for an IRIS providing detailed driving instructions to control vehicles;

identifying infrastructure intelligence level I=5 for an IRIS providing full control and management for individual vehicles and that manages a transportation network comprising the infrastructure and provides full active safety functions for vehicles.

10. The system of claim 1, wherein said system intelligence S is dependent on the vehicle intelligence V and the infrastructure intelligence I during vehicle operation.

11. The system of claim 1, wherein said CAVH system operates at a system intelligence level S=2, wherein the TCU/TCC control components of said CAVH system are used to provide intelligence to individual vehicles; and said CAVH system detects vehicle functioning status, vehicle acceleration, traffic signs, and traffic signals, wherein individual vehicles make decisions based on their own information and have driving automation, wherein said functions comprise:

a) sensing, wherein said vehicle subsystem provides more sensing than the IRIS;

b) transportation behavior prediction and management, wherein said vehicle subsystem provides more transportation behavior prediction and management than the IRIS;

c) planning and decision making, wherein said vehicle subsystem provides more planning and decision making than the IRIS; and d) vehicle control, wherein said vehicle subsystem provides more vehicle control than the IRIS.

12. The system of claim 1, wherein said CAVH system operates at a system intelligence level S=2, wherein the TCU/TCC control components of said CAVH system are used by said CAVH system to allocate functions to vehicles; said IRIS helps vehicles maintain speeds and provides collision warnings; and vehicles resolve control decision conflicts between vehicles and the IRIS.

13. The system of claim 1, wherein said CAVH system operates at a system intelligence level S=3, wherein said CAVH system integrates information collected from a plurality of vehicles, provides ad-hoc prediction and decision making for vehicles, and manages conditional automation driving tasks; and the TCU/TCC control components are used by the CAVH system to assign functions to said vehicle subsystem and/or to said IRIS; wherein said IRIS assists vehicles to make decisions based on the local environment and assists vehicles to operate for: a) following strategies, b) lane keeping strategies, c) lane changing strategies, d) merging and diverging strategies, and e) passing intersections; and vehicles resolve control decision conflicts between vehicles and the IRIS.

14. The system of claim 1, wherein said CAVH system operates at a system intelligence level S=4, wherein said CAVH system manages driving behavior within a road network, wherein the system detects and communicates detailed information within the road network, makes decisions based on vehicle and transportation information within the road network, manages driving automation tasks, and provides vehicle trajectories within a road network; and the TCU/TCC control components are used by the CAVH system to assign functions to said vehicle subsystem and said IRIS for sensing, decision making, and vehicle control; and vehicles resolve control decision conflicts between vehicles and the IRIS.

15. The system of claim 1, wherein said CAVH system operates at a system intelligence level S=5, wherein said CAVH system provides vehicle automation and system traffic automation, wherein the system manages a transportation network, the system detects and communicates detailed information within the transportation network, makes decisions based on information within the transportation network, and the system manages full driving automation tasks and coordinates control of all vehicles; and the TCU/TCC control components are used by the CAVH system to assign functions to said vehicle subsystem and said IRIS; wherein vehicles are controlled by IRIS and wherein control decisions are made by the CAVH system and communicated to vehicles through the IRIS.

16. The system of claim 1, wherein said CAVH system manages traffic comprising CAVH compatible vehicles.

17. The system of claim 1, wherein said CAVH system collects vehicle-generated data, sends collected data to RSUs, and receives inputs from said IRIS; wherein an OBU facilitates vehicle control based on the inputs from the IRIS, and the OBU assumes control of a vehicle having a failed vehicle control system.

18. The system of claim 1, wherein said IRIS facilitates vehicle operations and control for a CAVH system; wherein said IRIS provides individual vehicles with detailed customized information and time-sensitive control instructions for vehicles to fulfill driving tasks and provides operations and maintenance services for vehicles.

19. The system of claim 18, wherein the IRIS is built and managed as an open platform comprising subsystems owned and/or operated by different entities and shared among different CAVH systems physically and/or logically.

* * * * *

UNITED STATES PATENT AND TRADEMARK OFFICE
CERTIFICATE OF CORRECTION

PATENT NO. : 11,495,126 B2  
APPLICATION NO. : 16/406621  
DATED : November 8, 2022  
INVENTOR(S) : Fan Ding et al.

Page 1 of 1

It is certified that error appears in the above-identified patent and that said Letters Patent is hereby corrected as shown below:

In the Claims

Claim 9, Column 12, Line 10, delete the occurrence of "assigning"

Signed and Sealed this
Twenty-fourth Day of January, 2023

Katherine Kelly Vidal
*Director of the United States Patent and Trademark Office*